US 6,702,338 B2

(12) United States Patent
Vanasse

(10) Patent No.: US 6,702,338 B2
(45) Date of Patent: Mar. 9, 2004

(54) FLUE GAS CONDUIT JOINING CONNECTION

(75) Inventor: David C. Vanasse, Easthampton, MA (US)

(73) Assignee: Heat-Fab, Inc., Turners Falls, MA (US)

( * ) Notice: Subject to any disclaimer, the term of this patent is extended or adjusted under 35 U.S.C. 154(b) by 0 days.

(21) Appl. No.: 10/141,365

(22) Filed: May 9, 2002

(65) Prior Publication Data

US 2003/0209908 A1 Nov. 13, 2003

(51) Int. Cl.7 ................................................ F16L 23/00
(52) U.S. Cl. ..................... 285/407; 285/403; 285/410
(58) Field of Search ................................. 285/365, 366, 285/400, 403, 407, 410, 413, 411, 111, 53, 54, 123.15, 408

(56) References Cited

U.S. PATENT DOCUMENTS

| 63,797 A | 4/1867 | Hurd |
| 266,017 A | 10/1882 | Cooper |
| 1,279,935 A | 9/1918 | Sweat |
| 1,421,359 A | 7/1922 | Barr |
| 1,594,917 A | 8/1926 | Aaby |
| 1,603,100 A | 10/1926 | Aaby |
| 2,271,447 A | 1/1942 | Van Curler |
| 2,549,192 A | 4/1951 | Gersham |
| 2,650,112 A | 8/1953 | Kinkead |
| 2,650,114 A | 8/1953 | Epstein |
| 2,910,308 A | 10/1959 | Carr |
| 3,473,479 A | * 10/1969 | Sundholm ..................... 285/365 |
| 3,635,506 A | * 1/1972 | Womble et al. ............... 285/411 |
| 3,788,677 A | * 1/1974 | Stade et al. ................... 285/410 |
| 4,093,282 A | 6/1978 | Kyriakodis |
| 4,313,625 A | * 2/1982 | West ............................ 285/408 |
| 4,715,565 A | * 12/1987 | Wittmann ..................... 285/407 |
| 4,783,101 A | 11/1988 | Peterson |
| 4,784,202 A | * 11/1988 | White .......................... 285/411 |
| 4,874,191 A | 10/1989 | Green |
| 5,449,203 A | * 9/1995 | Sharp ....................... 285/123.15 |
| 5,857,718 A | 1/1999 | Kleinschmidt |
| 5,909,904 A | 6/1999 | Shea |
| 6,062,610 A | 5/2000 | Andersson |

FOREIGN PATENT DOCUMENTS

FR 2588357 * 4/1987 ................. 285/366

* cited by examiner

Primary Examiner—David Bochna
(74) Attorney, Agent, or Firm—McCormick, Paulding & Huber LLP

(57) ABSTRACT

A joining connection for the ends of flue gas conduits, each of which is provided with a complemental taper joint, each taper joint having equally-spaced locking tabs extending outwardly therefrom, the locking tabs of each conduit being so positioned as to be substantially axially aligned and in close adjacency when the taper joints of the conduits are joined, and a split clamping band or locking ring sleeved on the taper joints and having an integral screw tightening mechanism and a series of equally-spaced slots therein, with the locking tabs of each conduit being captured in the slots of the clamping band, whereby tightening of the screw mechanism brings the clamping band into tight engagement with the conduits for securely locking the conduits together.

8 Claims, 5 Drawing Sheets

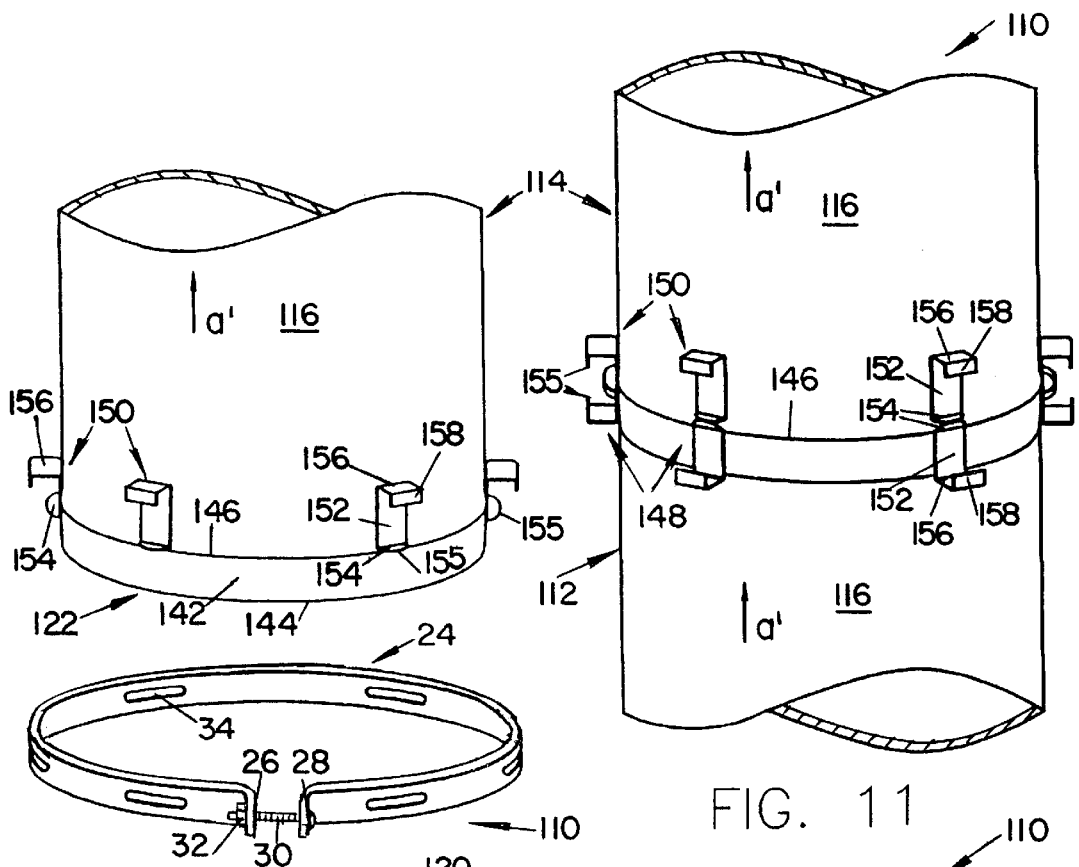
FIG. 11
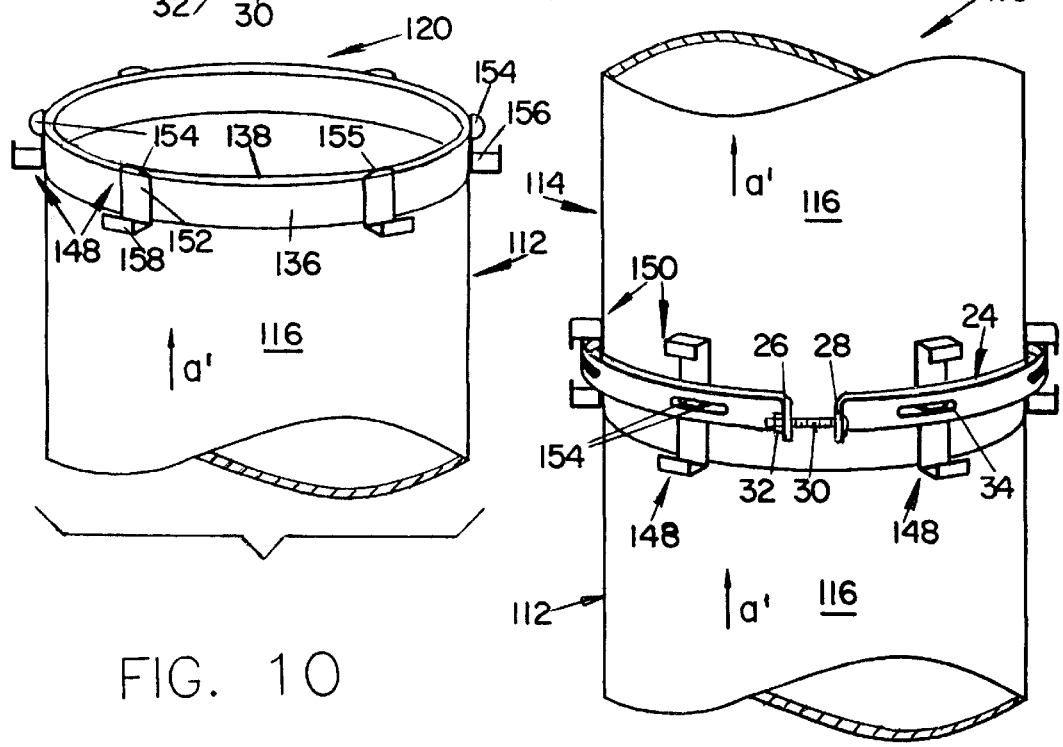
FIG. 10
FIG. 12

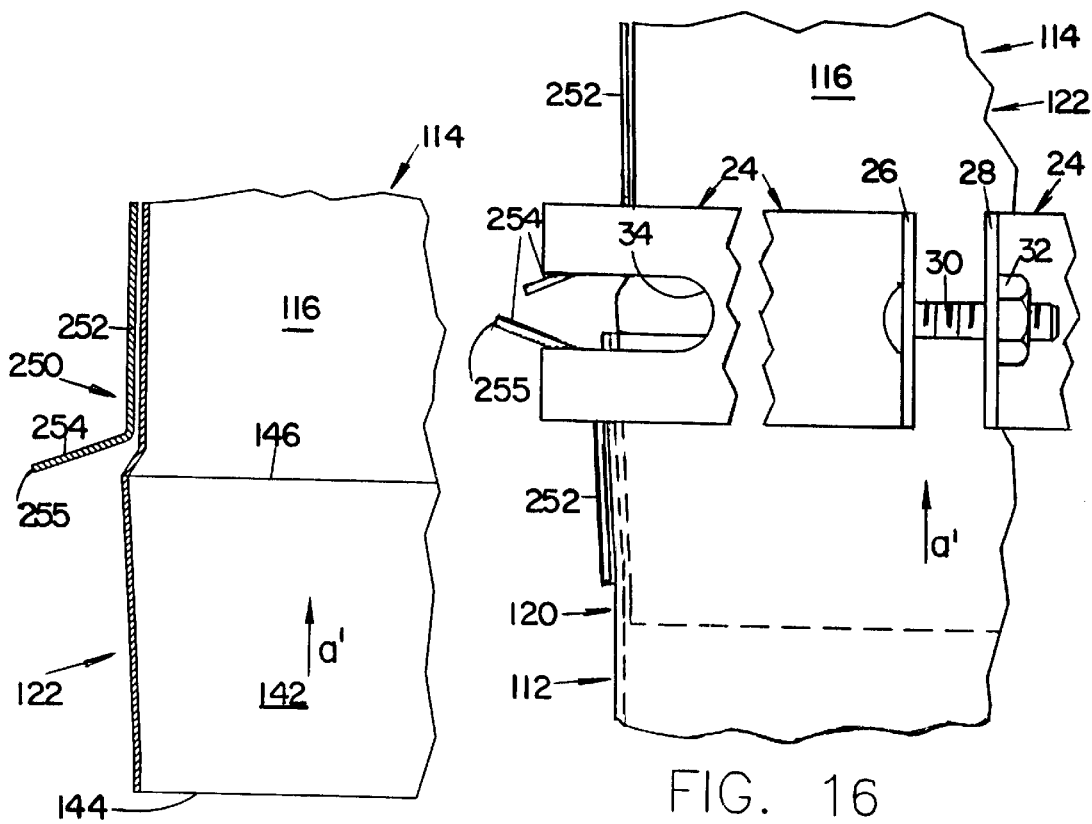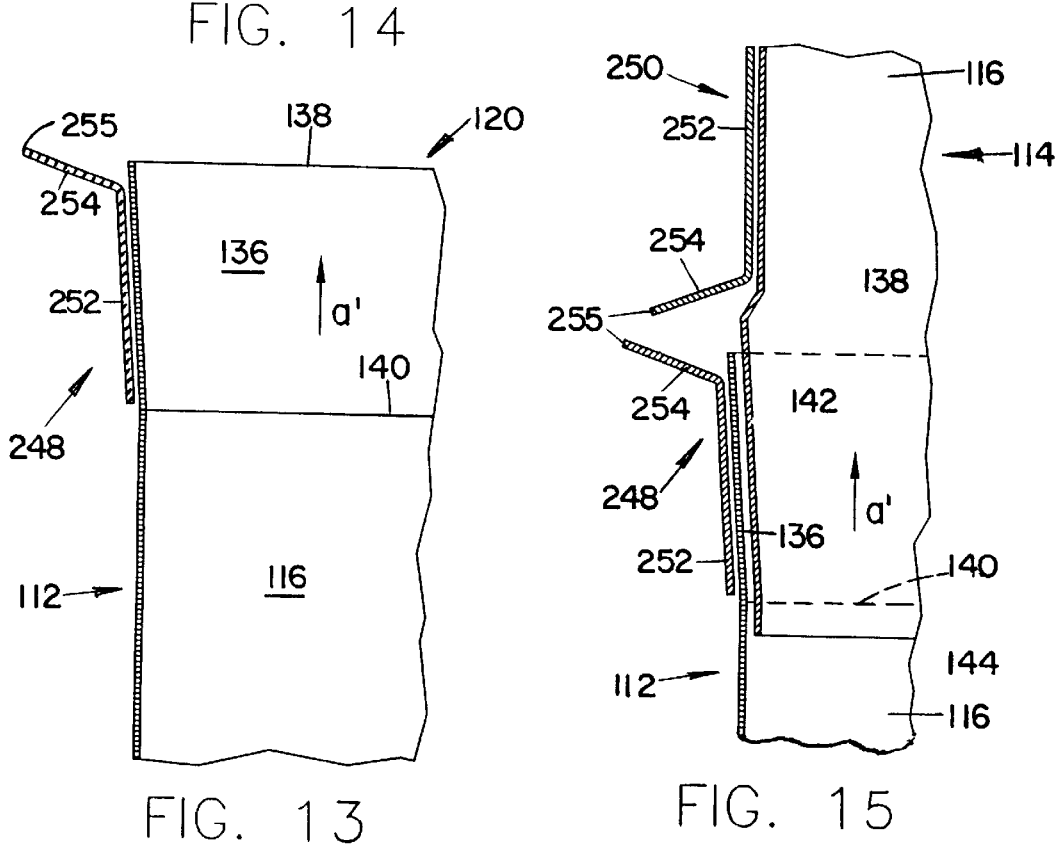

FLUE GAS CONDUIT JOINING CONNECTION

BACKGROUND OF THE INVENTION

1. Field of the Invention

The invention relates to connectors for joining together the ends of flue gas conduits of the type used for venting smoke and flue gases to the atmosphere.

2. Description of Related Art

U.S. Pat. No. 4,874,191 discloses a connection which utilizes a clamping ring and a fastening mechanism for joining together the tapered ends of flue gas conduits.

While this joining connection is satisfactory, it fails to provide air space clearance at the connection between the conduits, makes no provision for indexing of the tab fasteners, has no means for tightening the clamping ring, and does not permit assembly of the conduits without the necessity of rotating the components.

There is a need for a more rigorous vent system which utilizes a joining connection differing substantially from those presently available in the prior art.

SUMMARY OF THE INVENTION

The joining connection of the invention employs a tapered joint geometry at the flue gas conduit ends; but, rather than the fastening mechanism of the prior art, a substantially more rigorous mechanical locking system is utilized which comprises shaped, strategically located, locking tabs which provide a means for securing together the conduit ends, and a clamping band or locking ring having slots for capturing the locking tabs and a screw mechanism for tightening the band from a single location, thereby affording fast installation for locking the conduits together.

In one of its embodiments the conduits of the flue gas joining connection of the invention employ a double-wall construction of spaced, concentric, inner and outer walls.

This double-wall construction allows for an insulating blanket of air (or other tangible materials such as fiberglass, mineral wool, etc.) between the inner wall and the outer wall. This air insulation has the advantage of keeping the flue gases warmer, as well as making the skin temperature of the outer wall cooler than would be possible with an uninsulated single-wall section. The reduced skin temperature allows the joining connection of the invention to be installed in closer proximity to combustible materials.

BRIEF DESCRIPTION OF THE DRAWINGS

FIG. 10 is an exploded, fragmentary, front perspective view of a flue gas conduit joining connection before assembly of a pair of conduits, embodying a second form of the invention;

FIG. 11 is a front perspective view of the flue gas conduit joining connection of FIG. 10 following assembly of the conduits and prior to installation of a clamping band or locking ring;

FIG. 12 is a front perspective view similar to FIG. 11 following installation of a clamping band or a locking ring;

FIG. 13 is a somewhat schematic, fragmentary, cross sectional view of the female end of one of the conduits of FIG. 10;

FIG. 14 is a somewhat schematic, fragmentary, cross sectional view of the male end of one of the conduits of FIG. 10;

FIG. 15 is a somewhat schematic, fragmentary, cross sectional view of the male and female ends of the conduits of FIGS. 13 and 14 following interengagement; and FIG. 16 is a somewhat schematic, fragmentary, cross sectional view similar to FIG. 15 following installation of a clamping band or locking ring.

DETAILED DESCRIPTION OF THE INVENTION

Referring first to FIGS. 1–9, a flue gas conduit joining connection, generally indicated by 10, embodying a first form of the invention, is provided for joining the end of a first cylindrical flue gas conduit, generally indicated by 12, to the end of a second cylindrical flue gas conduit generally indicated by 14.

Figure 5:
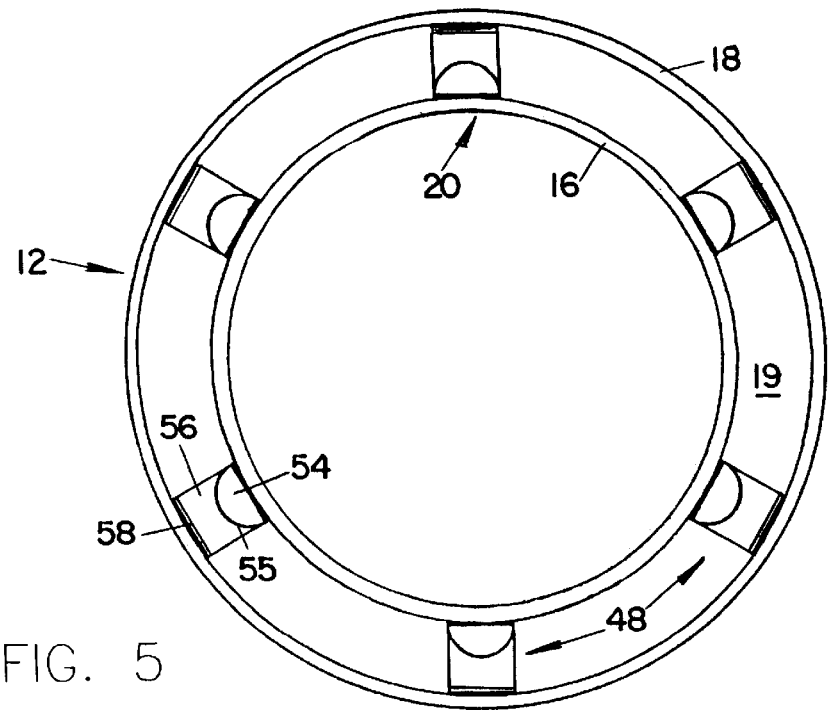
FIG. 5 is a top plan view of the flue gas conduit of FIG. 4.
Figure 4:
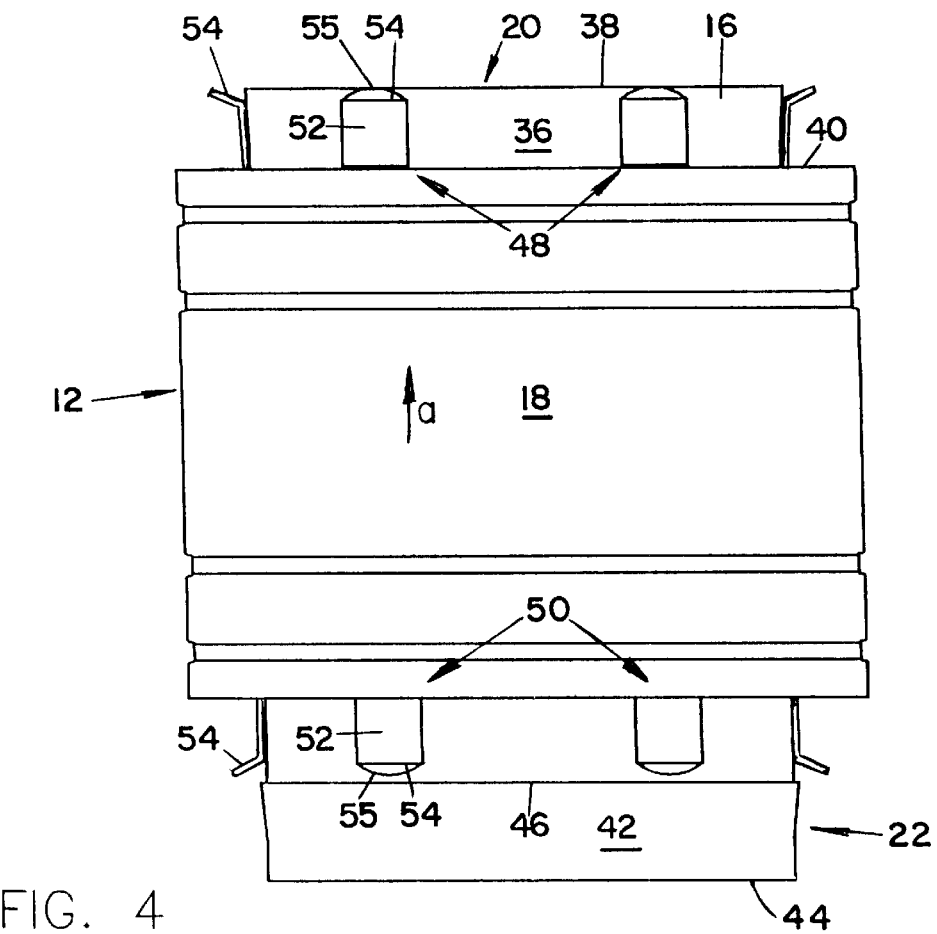
FIG. 4 is a front elevational view of one of the flue gas conduits of FIG. 1.

Conduits 12 and 14 are identical, with conduit 12 being shown in FIGS. 4 and 5 for illustrative purposes.

Each conduit 12 and 14 has a double-wall construction which includes an inner pipe 16 and an outer shield 18 spaced from and concentric therewith.

This double-wall construction provides a space 19 for an insulating blanket of air or other tangible material such as fiberglass, mineral wool, not shown, between inner wall 16 and outer shield 18. This insulation has the advantage of keeping the flue gases warmer, as well as making the skin temperature of outer shield 18 cooler than would be possible with an uninsulated single-wall section. This reduced skin temperature allows the forming connection of the invention to be installed in closer proximity to combustible materials.

Inner pipe 16 has a female component, generally indicated by 20, formed integrally on one of its ends and a male component, generally indicated by 22, formed integrally on its opposite end.

Female component 20 of inner pipe 16 of first conduit 12, and male component 22 of inner pipe 16 of second conduit 14 are adapted to be brought into mating, telescopic relationship and clamped together by an annular clamping band or locking ring generally indicated by 24.

Clamping band or locking ring 24 is split centrally of its length to provide adjacent offset ends 26 and 28 each of which has a central opening therein, not shown, through which a bolt 30 extends, the bolt having a nut 32 threaded thereon.

Clamping band 24 or locking ring is provided with a plurality of equi-spaced, longitudinally-extending slots 34 along its longitudinal axis, all for purposes to appear.

The direction of flue gas flow in the conduits is indicated by the arrow "a" in FIGS. 1–9 of the drawings.

Female component 20 of inner pipe 16 of each conduit 12 and 14, includes a bell-shaped, annular end joint 36 which tapers inwardly from an outer end face 38 and terminates at an inner shoulder 40 which merges with the body of inner pipe 16.

Male component 22 of inner pipe 16 of each conduit 12 and 14 includes a reverse, bell-shaped, annular end joint 42 which tapers outwardly from an outer end face 44 and terminates at an inner shoulder 46 which merges with the body of inner pipe 16.

A first set of locking members, generally indicated by 48, is fixed to the outer periphery of end joint 36 of female component 20 at equally-spaced intervals around the circumference of the end joint and are located at or adjacent the outer end of end joint 36, for purposes to appear.

A second set of locking members, generally indicated by 50, is fixed to the outer periphery of inner pipe 16, and are located immediately above shoulder 46 and adjacent end joint 42 of male component 22 at equally-spaced intervals around the circumference inner pipe 16, also for purposes to appear.

The spacing between the locking members of each set of locking members 48 and 50 corresponds to the spacing between slots 34 of clamping band or locking ring 24, also for purposes to appear.

Figure 7:
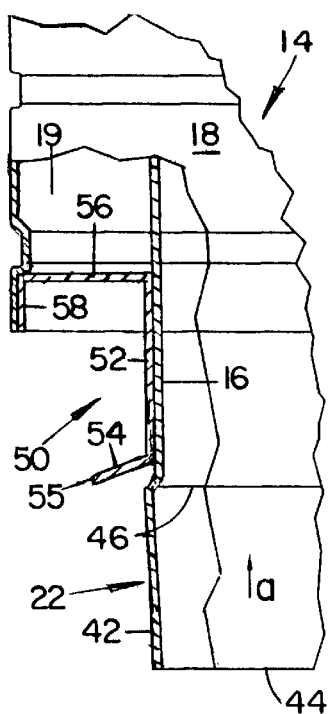
FIG. 7 is a somewhat schematic, fragmentary, part sectional view of the male end of one of the conduits of FIG. 1.
Figure 8:
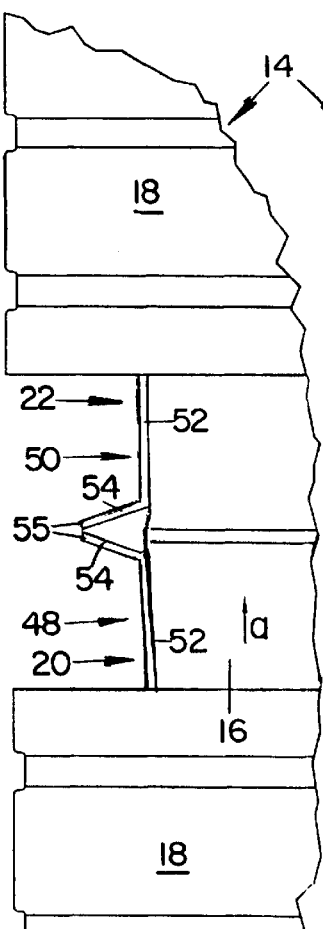
FIG. 8 is a somewhat schematic, fragmentary, part sectional view of the male and female ends of the conduits of FIGS. 6 and 7 following interengagement.
Figure 6:
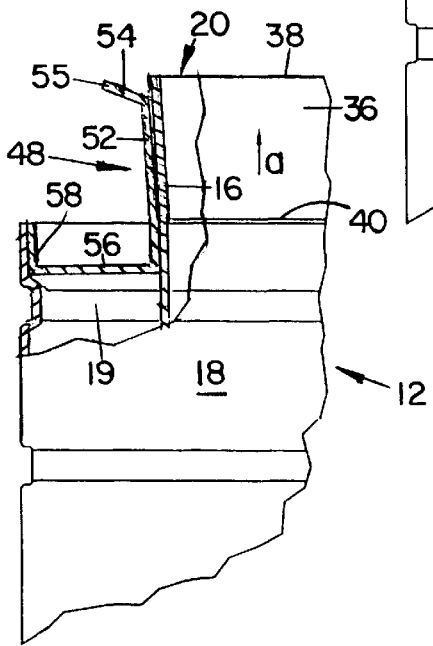
FIG. 6 is a somewhat schematic, fragmentary, part sectional view of the female end of one of the conduits of FIG. 1.

As best seen in FIGS. 6 and 7, the locking members of each set 48 and 50 are identical and are somewhat U-shaped in side elevation.

Each locking member includes a flat, rectangular, upright wall 52 which has an integral locking tab 54 extending angularly outwardly from one of its ends and an integral base wall 56 which extends horizontally outwardly from its opposite end.

The outer ends of locking tabs 54 are preferably rounded as at 55, thereby providing a smooth surface less apt to injure an installer handling the conduits and for other purposes, as will appear.

However, while a rounded end on locking tabs 54 is preferred, the ends may have any other shape, such as square, rectangular, triangular, etc.

Base wall 56 has an integral upright finger 58 extending outwardly from its opposite outer end in the direction of locking tab 54 and disposed in spaced, substantial parallelism to upright wall 52.

Upright wall 52 of each locking member of first set 48 is fixed to the outer periphery of end joint 36 of female component 20 of inner pipe 16 as by spot welds, not shown, while each finger 58 is similarly fixed to the inner periphery of outer shield 18 as by a spot weld, not shown.

Upright wall 52 of each locking member of second set 50 is fixed to the outer periphery of inner pipe 16 immediately adjacent end joint 42 of male component 22 as by spot welds, not shown, while each finger 58 is similarly fixed to the inner periphery of outer shield 19 as by a spot weld, not shown.

In addition to their other functions, the locking members of each set 48 and 50 serve to hold outer shield 18 in spaced concentricity to inner pipe 16, as will appear.

As shown in the drawings, upright wall 52, base wall 56 and upright finger 58 of the locking members or each set 48 and 50 provide about one inch of separation between inner pipe 16 and outer shield 18. However, greater or lesser separation distances between the components may be provided, as desired.

Reverse bell-shaped end joint 42 of male component 22 is of appropriate size and configuration as to be telescopically receivable in bell-shaped end joint 36 of female component 20 when the ends of the two components are interengaged.

When component 20 of first flue gas conduit 12 and component 22 of second flue gas conduit 14 are interengaged, the position of locking tabs 54 of the first set of locking members 48 on female component 20, and the position of locking tabs 54 on the second set of locking members 50 on male component 22, is such that the locking tabs of each set 48 and 50 are aligned and are disposed in close adjacency, as shown in FIGS. 2,3,8 and 9.

It will be recalled that locking tabs 54 of first set 48 are located at or adjacent outer end face 38 of end joint 36 of female component 20, while locking tabs 54 of second set 50 are located immediately above shoulder 46 and adjacent end joint 42 of male component 22.

This placement of locking tabs 54 of first and second sets 48 and 50, respectively, is important, since such placement is related to the amount of overlap which occurs when component 22 is assembled into female component 20, assuring that the locking tabs of each set are disposed in close adjacency when the components 20 and 22 are interengaged.

Figure 1:
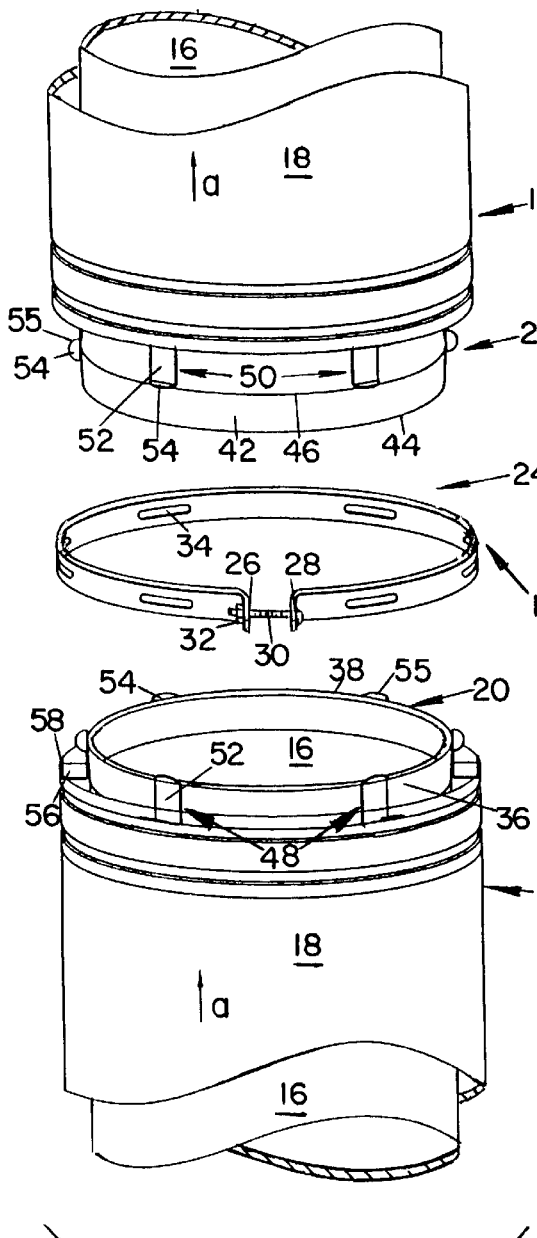
FIG. 1 is an exploded, fragmentary, front perspective view of a flue gas conduit joining connection before assembly of a pair of conduits, embodying a first form of the invention.
Figure 2:
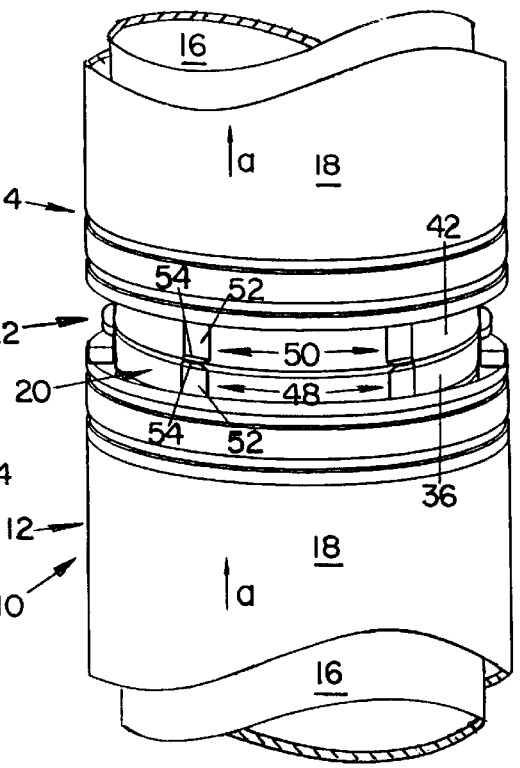
FIG. 2 is a front perspective view of the flue gas conduit joining connection of FIG. 1 following assembly of the conduits and prior to installation of a clamping band or locking ring.
Figure 3:
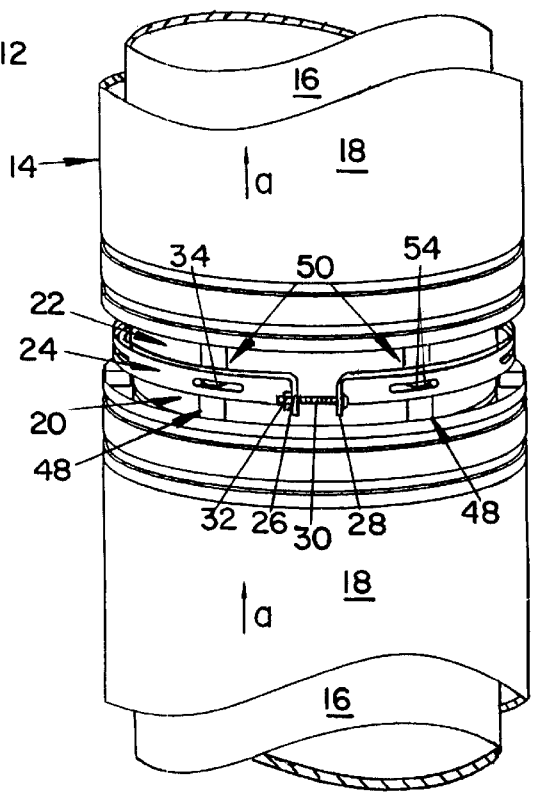
FIG. 3 is a front perspective view similar to FIG. 2 following installation of a clamping band or locking ring.
Figure 9:
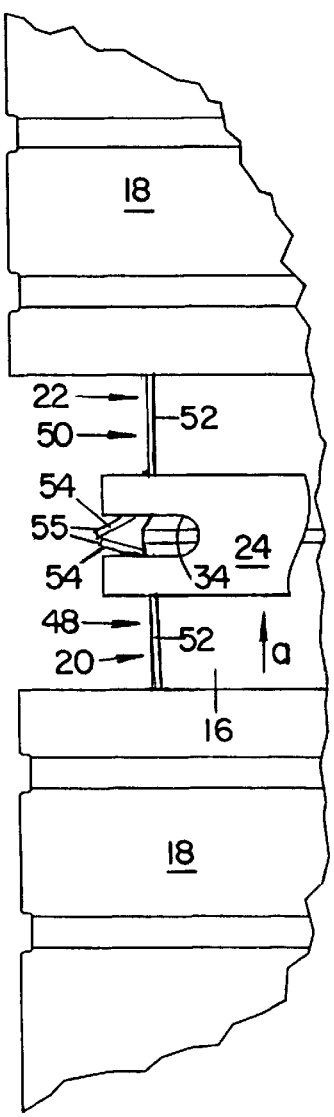
FIG. 9 is a somewhat schematic, fragmentary, part sectional view similar to FIG. 8 following installation of a clamping band or locking ring.

At this time, clamping band or locking ring 24 is assembled onto components 20 and 22 as shown in FIGS. 3 and 9, with locking tabs 54 of both components extending through and being captured in slots 34 of band 24, with the slots being of sufficient length as to easily accommodate the locking tabs.

Rounded ends 55 of locking tabs 54 facilitate entry of the locking tabs into slots 34 of band 24 while insuring against injury to the installer.

Bolt 30 is now tightened relative to nut 32, drawing offset ends 26 and 28 of clamping band or locking ring 24 closer together to bring the clamping band into tight engagement with components 20 and 22 to securely lock first conduit 12 and second conduit 14 together.

Clamping band or locking ring 24 provides a mechanical connection between the two assembled conduits. It also serves to pull together the conduits, making a pressure-tight assembly. Locking ring 24 may be tightened from a single location using a hand tool. This single-point fastening system is an improvement over previous structures as it allows one installer to complete an assembly without rotating the conduits, or repositioning himself relative to the conduits.

Referring now to FIGS. 10–16, a flue gas joining connection, generally indicated by 110, embodying a second form of the invention, is provided for joining the end of a first cylindrical flue gas conduit, generally indicated by 112, to the end of a second cylindrical flue gas conduit, generally indicated by 114.

In the embodiment of FIGS. 10–16, flue gas conduits 112 and 114 have no outer shields; otherwise, conduits 112 and 114 and joining connection 110 are identical to conduits 12 and 14 and joining connection 10 of the embodiment of FIGS. 1–9.

Each conduit 112 and 114 includes a main body portion 116 which has a female component, generally indicated by 120, formed integrally on one of its ends and a male component, generally indicated by 122, formed integrally on its opposite end.

Female component 120 of first conduit 112, and male component 122 of second conduit 114 are adapted to be brought into mating, telescopic relationship and clamped together by annular clamping band or locking ring 24 of FIGS. 1–9.

The direction of flue gas flow in conduits 112 and 114 is indicated by the arrow "a'"in FIGS. 10–16 of the drawings.

Female component 120 of both conduits 112 and 114 includes a bell-shaped, annular end joint 136 which tapers inwardly from an outer end face 138 and terminates at an inner shoulder 140 which merges with main body portion 116 of each conduit.

Male component 122 of each conduit 112 and 114 includes a reverse, bell-shaped, annular end joint 142 which tapers outwardly from an outer end face 144 and terminates at an inner shoulder 146 which merges with main body portion 116 of each conduit.

In the embodiment of FIGS. 10–12, a first set of locking members, generally indicated by 148, is fixed to the outer periphery of end joint 136 of female component 120 of each conduit 112 and 114 at equally-spaced intervals around the circumference of end joint 136, and are located at or adjacent the outer end of end joint 136, for purposes to appear.

A second set of locking members, generally indicated by 150, is fixed to the outer periphery of main body portion 116, and are located immediately adjacent end joint 142 of male component 122 of each conduit 112 and 114 at equally-spaced intervals around the circumference of end joint 142, also for purposes to appear.

The spacing between the locking members of each set of locking members 148 and 150 corresponds to the spacing between slots 34 of clamping band or locking ring 24, for purposes to appear.

The locking members of each set 148 and 150 are identical to the locking members of each set 48 and 50 of the embodiment of FIGS. 1–9.

The locking members of each set 148 and 150 are somewhat U-shaped in side elevation and include a flat, rectangular, upright wall 152 which has an integral locking tab 154 extending angularly outwardly from one of its ends and an integral base wall 156 extending horizontally outwardly from its opposite end. Locking tab 154 preferably has a rounded outer end 155 for purposes as discussed with regard to locking tab 54.

Base wall 156 has an integral upright finger 158 extending outwardly from its opposite outer end and disposed in spaced, substantial parallelism to upright wall 152.

Upright wall 152 of each locking member of first set 148 is fixed to the outer periphery of end joint 136 of female component 120 of each conduit 112 and 114 as by spot welds, not shown.

Upright wall 152 of the locking members of second set 150 is fixed to the outer periphery of main body portion 116 immediately adjacent end joint 142 of male component 122 of each conduit 112 and 114 as by spot welds, not shown.

Referring to FIGS. 13–16, since an outer shield is not employed with conduits 112 and 114, a more simplified locking means may be utilized.

In FIGS. 13–16, a first set of locking members, generally indicated by 248, is fixed to the outer periphery of end joint 136 of female component 120 of first conduit 112.

A second set of locking members, generally indicated by 250, is fixed to the outer periphery of main body portion 116 immediately adjacent end joint 142 of male component 122.

The locking members of each set 248 and 250 are somewhat L-shaped in side elevation and include a flat, rectangular, upright wall 252 which has an integral locking tab 254 extending angularly outwardly from one end. Locking tab 254 preferably has a rounded outer end 255 for purposes as discussed with regard to locking tab 54.

Upright wall 252 of the locking member of first set 248 is fixed to the outer periphery of end joint 136 of female component 120 of first conduit 112 as by spot welds, not shown.

Upright wall 252 of the locking members of second set 250 is fixed to the outer periphery of main body portion 116 immediately adjacent end joint 142 of male component 122 of second conduit 114 as by spot welds, not shown.

Reverse bell-shaped end joint 142 of male component 122 of second conduit 114 is of appropriate size and configuration as to be telescopically receivable in bell-shaped end joint 136 of female component 120 of first conduit 112 when the ends of the two components are interengaged.

In the embodiment of FIGS. 10–16, as with the embodiment of FIGS. 1–9, when components 120 and 122 of conduits 112 and 114 are interengaged, locking tabs 154 or 254 of the first set of locking members 148 or 248 of female component 120 are substantially aligned with and are disposed in close adjacency to locking tabs 154 or 254 of the second set of locking members 150 or 250 of male component 122.

At this time, and as shown in FIG. 16, clamping band or locking ring 24 is assembled onto components 120 and 122, with locking tabs 154 or 254 of both components extending through and being captured in slots 34 of band 24, with the slots being of sufficient length to easily accommodate the locking tabs.

Bolt 30 is now tightened relative to nut 32 to draw offset ends 26 and 28 of clamping band or locking ring 24 closer together, bringing the band into tight engagement with components 120 and 122 to securely lock conduits 112 and 114 together.

I Claim:

1. A joining connection for flue gas conduits comprising, a pair of flue gas conduits, complemental male and female taper joints on the ends of the conduits, locking means comprising spaced locking tabs on the end of each conduit, the locking tabs extending outwardly from each conduit and being positioned in close adjacency and in substantial axial alignment when the male and female taper joints on the ends of the conduits are joined, clamping means sleeved on the ends of the conduits, the clamping means having an integral tightening mechanism and a series of openings therein, with the locking tabs of each conduit being captured in the openings of the clamping means, whereby tightening of the tightening mechanism moves the clamping means into close engagement with the conduits for locking the conduits together.

2. A joining connection according to claim 1, wherein the locking means comprise equally-spaced locking tabs extending outwardly from each conduit.

3. A joining connection according to claim 1, wherein the locking means comprise equally-spaced locking tabs extending outwardly from each conduit and where the spacing between the locking tabs of each conduit is the same.

4. A joining connection according to claim 1, wherein the locking tabs are on the taper joint on one of the ends of each conduit and are positioned closely adjacent the end of the taper joint and wherein the locking tabs are on the opposite end of the conduit and are positioned in spaced relation to the end of the taper joint.

5. A joining connection according to claim 1, wherein the clamping means is a split clamping band.

6. A joining connection according to claim 1, wherein the tightening mechanism is a screw mechanism.

7. A joining connection according to claim 1, wherein the openings in the clamping means comprise equally-spaced slots.

8. A joining connection according to claim 1, wherein the pair of flue gas conduits each has an inner pipe and an outer shield, and wherein the complemental taper joints are on the ends of the inner pipes.

* * * * *